Oct. 20, 1970     V. Y. S. HONG     3,535,043
STEREOGONIOMETER
Filed Dec. 10, 1968     2 Sheets-Sheet 1
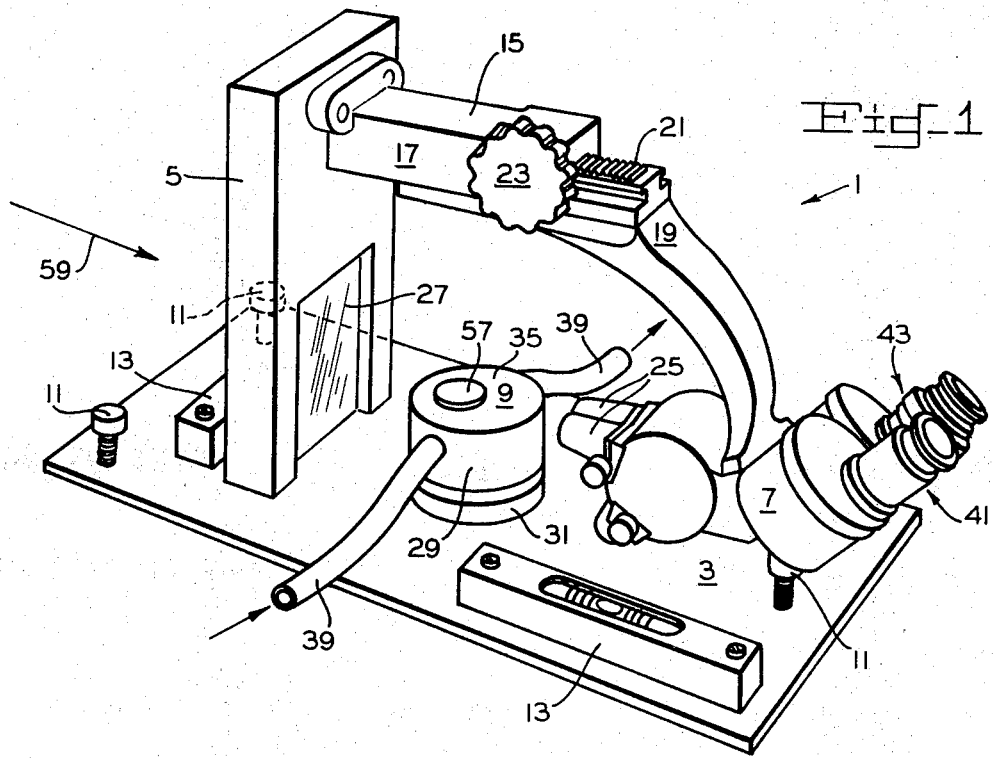
Fig_1
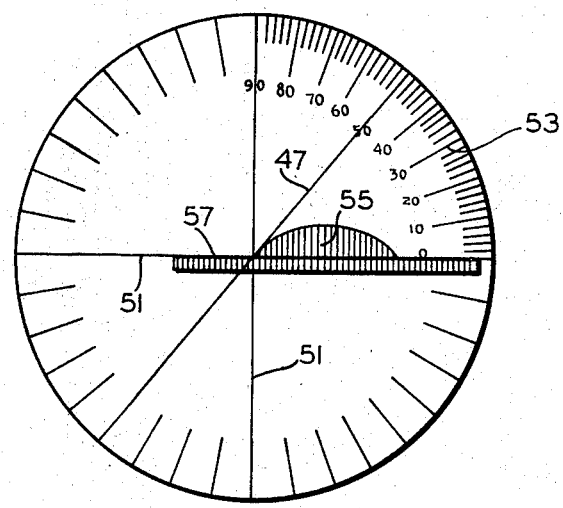
Fig_2
INVENTOR.
Van Y. S. Hong
BY
*Harry M. Saragovitz, Edward J. Kelly,
Herbert Berl, & Gilbert E. Connell Jr.*
ATTORNEYS.

Oct. 20, 1970  V. Y. S. HONG  3,535,043
STEREOGONIOMETER
Filed Dec. 10, 1968  2 Sheets-Sheet 2
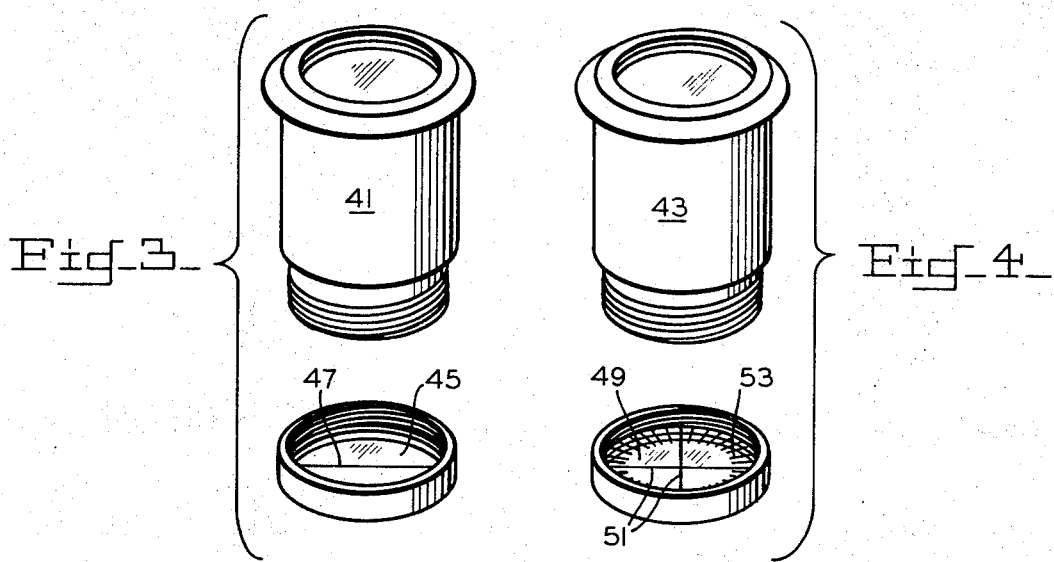
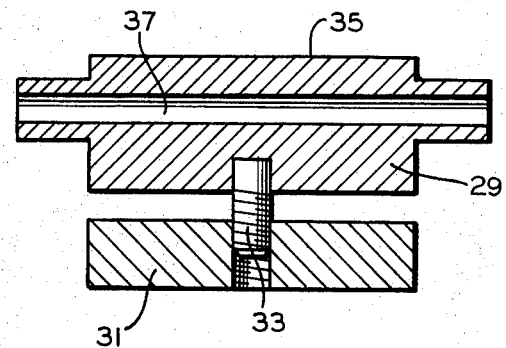
INVENTOR.
Van Y. S. Hong
ATTORNEYS.

3,535,043
STEREOGONIOMETER

Van Y. S. Hong, Rock Island, Ill., assignor to the United States of America as represented by the Secretary of the Army
Filed Dec. 10, 1968, Ser. No. 782,573
Int. Cl. G01b *11/26;* G01n *13/00;* G02b *27/36*
U.S. Cl. 356—171                               6 Claims

ABSTRACT OF THE DISCLOSURE

A stereogoniometer is provided for measuring contact angles formed by fluid drop specimens on solid surfaces. The instrument includes a horizontal drop receiving platform and a stereoscopic microscope for observing the profile of the drop. The microscope has one eyepiece provided with a rotatable cross hair and the other eyepiece provided with a protractor scale whereby the contact angle of the fluid drop is measurable directly by the viewer.

---

The invention described herein may be manufactured, used, and licensed by or for the Government for governmental purposes without the payment to me of any royalty thereon.

BACKGROUND OF THE INVENTION

The present invention relates to an apparatus useful in fundamental research in surface chemistry as well as in various fields of applied and development research such as corrosion inhibition, mineral flotation, water-repellency and waterproofing of textile, detergency in laundry, petroleum technology, metallurgy, and soldering technology, and more particularly to a steregoniometer for observing the profile of a drop specimen and measuring directly the contact angle of the drop.

The apparatus of the present invention is conducive to the problem of relating the contact angle of a drop specimen on various substrates. In such an analysis, the contact angle is a measurable quantity which is used to characterize the behavior of a liquid on a solid at the three phases in the system.

Contact angles of fluid drops on solid surfaces can be measured by several different methods. Basically, there are three procedures for determining the contact angle formed by a drop of fluid in equilibrium on a solid surface. In the first procedure, contact angles can be calculated from the volume and diameter measurements of each drop. In the second procedure, the contact angles can be measured by observing the angle of reflection of a light beam on the drop. The third procedure is to observe the drop profile. In this latter procedure, a tangent to the drop surface at the three-phase interface is made and the contact angle is measured with a protractor.

A primary object of the present invention is to provide an apparatus to practice the last of the above-mentioned procedures by measuring the angle of the tangent to the drop surface at its three-phase interface.

Another object of the present invention is to provide an instrument for measuring the contact angle of drop specimens which will facilitate reading the measurement thereof thereby tending to reduce eye fatigue of the user.

Still another object of the present invention is to provide an instrument for measuring the contact angle of drop specimens which is relatively simple to operate, and which permits measurement of the angle while viewing the specimen.

A further object of the present invention is to provide an instrument for measuring the contact angle of drop specimens which utilizes stereoscopic vision thereby achieving greater precision in the measurement of contact angles particularly in cases where high magnification is employed.

It is also an object of the present invention to provide an instrument for measuring the contact angle of drop specimens which will maintain the specimen at a constant temperature thereby to effect more accurate and uniform measurements.

SUMMARY OF THE INVENTION

In accordance with the present invention, a stereogoniometer is provided which comprises a stereoscopic microscope mounted for viewing the profile of a drop specimen disposed on a temperature controlled platform. One eyepiece of the stereoscopic microscope is provided with a rotatable transparent disc having cross hairs disposed normal to each other and with a protractor scale on the circumferential periphery thereof. The other eyepiece is provided with a rotatable transparent disc having a single centrally disposed cross hair. These discs are rotated relative to each other and with respect to the profile of the drop specimen as viewed through the stereoscopic microscope in a manner to measure the contact angle of the specimen. The protractor scale being disposed within the eyepiece enables a direct reading of the angle while viewing the profile of the specimen.

BRIEF DESCRIPTION OF THE DRAWINGS

The novel features characteristic of the present invention, as well as additional objects and advantages thereof, will be understood better from the following description when read in connection with the accompanying drawings, in which:

FIG. 1 is a perspective view of the stereogoniometer of the present invention;

FIG. 2 is a view as seen simultaneously through both eyepieces of the stereogoniometer;

FIG. 3 is an exploded view of the left eyepiece of the stereogoniometer;

FIG. 4 is an exploded view of the right eyepiece of the stereogoniometer; and,

FIG. 5 is an enlarged, central section of the constant temperature platform of the stereogoniometer.

DESCRIPTION OF A PREFERRED EMBODIMENT

Referring more particularly to the drawings, wherein similar reference characters have been used to designate corresponding parts throughout, there is shown a stereogoniometer 1, in accordance with the present invention. A prefered embodiment of the present invention is shown in FIG. 1 of the drawings which comprises a support or base 3 having an upwardly extending pillar 5, a stereoscopic microscope 7, and a specimen drop receiving platform or stage 9.

The support is provided with three levelling screws 11 and a pair of level vials 13 disposed normal to each other to facilitate the platform being adjusted to a level position. The pillar 5 extends upwardly from and normal to the base 3 and has a laterally extending arm 15 for supporting the stereoscopic microscope 7.

The laterally extending arm 15 comprises a fixed portion 17 and a movable portion 19 which is adjustably arranged for horizontal movement by a rack 21 and pinion 23 mechanism. The movable arm portion 19 is freely supported by the fixed portion and curves downwardly in a manner to support the stereoscopic microscope 7 with its optical objective lens axes in a horizontal plane above and parallel to the base 3. The objective lenses 25 of the stereoscopic microscope are directed toward but spaced from a translucent window 27 provided in the pillar 5.

The specimen drop receiving platform 9 is a cylindrical member which is disposed on the base 3 for freedom of movement between the objective lenses 25 and the translucent window 27. The specimen receiving platform comprises at least two distinct members 29, 31 as shown particularly in FIG. 5 of the drawing. The two members are attached together by a threaded member, such as a screw 33, which permits adjustment of the one member relative to the other, thereby to control the height of the specimen receiving surface 35 from the base 3. The upper member 29 is provided with a fluid receiving chamber 37 which extends diametrically therethrough and beyond the cylindrical outer surface for attaching fluid inlet and outlet members 39 whereby the specimen receiving surface 35 may be maintained at a controlled temperature.

The stereoscopic microscope 7 is of conventional type except for the oculars or eyepieces 41, 43 which have been converted to permit direct measurement of the contact angle. The left ocular 41, shown particularly in FIG. 3 of the drawings, is provided with a transparent disc 45 which has a single cross hair 47 diametrically disposed across its face. The right ocular 43, shown particularly in FIG. 4 of the drawings, is provided with a transparent disc 49 having two cross hairs 51 disposed diametrically across its face and also disposed normal to each other. The circumferential periphery of the disc 49 is provided with a protractor scale 53 the quadrants of which may be graduated differently for different degrees of angular measurement, as shown particularly in FIG. 2 of the drawings. Both of the discs 45, 49 are rotatable along with their respective oculars 41, 43 to which they are attached.

Operation of the stereogoniometer is described using as an example the drop specimen 55, shown in FIG. 2 of the drawing, placed upon a specimen surface 57. The specimen surface is placed upon the constant temperature surface 35 and made level by means of the adjusting screws 11. Illumination for the drop profile is provided from a light source (not shown) directed upon the translucent window 27, as indicated by the arrow 59. Vertical adjustment of the specimen surface is accomplished by rotating the lower disc member 31 relative to the upper constant temperature member 29 until the specimen receiving surface 57 is level with one of the cross hairs 51 associated with the protractor scale 53. Lateral adjustment of the specimen relative to the stereoscopic microscope is accomplished by sliding the specimen drop receiving platform 9 on the upper smooth surface of the base 3 until the edge of the drop lies close to the intersection of the two cross hairs 51 of the protractor disc 49. A tangent to the drop specimen surface at the three-phase interface is made by adjusting the single cross hair 47 of the other disc 45. The contact angle may then be read directly from the protractor scale without the viewer interrupting his view of the specimen drop. For example, the illustration in FIG. 2 shows the contact angle of the drop specimen 55 to be 50 degrees.

It will be recognized by persons skilled in the art that the stereogoniometer of the present invention is an accurate and reliable tool for the determination of contact angles of any gas, liquid, and solid system. The operation and techniques of measurement are simple, economical, and rapid. The problems of contamination and eye fatigue inherent in such delicate operations are minimized. Although but a single, preferred embodiment of the present invention has been shown and described herein, it will also be recognized by those persons skilled in the art that modifications and other embodiments thereof are possible within the limits of the claims presented herein. Accordingly, applicant desires that this application be considered as illustrative rather than limited to the single embodiment presented herein.

I claim:

1. A stereogoniometer comprising a support having a horizontal stage for receiving a drop specimen, a stereoscopic microscope including a pair of objectives and a pair of eyepieces, said microscope being carried by said support in a manner to dispose the optical axes of said objectives in a horizontal plane common with that including the drop receiving surface of said stage, and means in said eyepieces for measuring the contact angle of said drop specimen.

2. The invention defined in claim 1 wherein said contact angle measuring means comprises separate transparent discs disposed respectively in the optical paths of said eyepieces, one of said discs having a single cross hair disposed through the optical axis of its associated eyepiece, the other one of said discs being provided with a pair of cross hairs disposed through the optical axis of its associated eyepiece and also disposed normal to each other, the periphery of said other disc being provided with distinctive marks for determining angular measurement.

3. The invention as defined in claim 2 whereby said eyepieces together with said discs are rotatably mounted.

4. The invention as defined in claim 3 wherein said horizontal stage includes adjusting means for disposing said drop specimen receiving surface in a plane including the optical axes of said objectives.

5. The invention as defined in claim 4 wherein said support includes means for illuminating the drop specimen profile.

6. The invention as defined in claim 5 wherein said horizontal stage includes means for maintaining said drop specimen receiving surface at a controlled temperature.

References Cited

UNITED STATES PATENTS

| | | |
|---|---|---|
| 2,769,370 | 11/1956 | Tompkins. |
| 3,237,519 | 3/1966 | Pettauel et al. |
| 3,483,737 | 12/1969 | Jennings Jr. et al. |
| 3,484,150 | 12/1969 | Toaka et al. |

FOREIGN PATENTS

| | | |
|---|---|---|
| 659,978 | 1964 | Italy. |

RONALD L. WIBERT, Primary Examiner

J. ROTHENBERG, Assistant Examiner

73—64.4; 350—10, 130